(12) United States Patent
Jepsen et al.

(10) Patent No.: US 10,775,741 B2
(45) Date of Patent: Sep. 15, 2020

(54) CO-LOCATED IMAGING AND DISPLAY PIXEL

(71) Applicant: Open Water Internet Inc., San Francisco, CA (US)

(72) Inventors: Mary Lou Jepsen, Sausalito, CA (US); Jae Hyeong Seo, Pleasanton, CA (US); Ian David O'Donnell, San Jose, CA (US)

(73) Assignee: Open Water Internet Inc., San Francisco, CA (US)

( * ) Notice: Subject to any disclaimer, the term of this patent is extended or adjusted under 35 U.S.C. 154(b) by 0 days.

(21) Appl. No.: 15/984,319

(22) Filed: May 19, 2018

(65) Prior Publication Data

US 2018/0335753 A1 Nov. 22, 2018

Related U.S. Application Data

(60) Provisional application No. 62/509,704, filed on May 22, 2017.

(51) Int. Cl.
*G03H 1/22* (2006.01)
*G03H 1/00* (2006.01)
(Continued)

(52) U.S. Cl.
CPC ......... *G03H 1/2286* (2013.01); *G03H 1/0005* (2013.01); *G03H 1/0808* (2013.01);
(Continued)

(58) Field of Classification Search
CPC ............ G02F 1/1368; G02F 1/136286; G02F 1/133514; G02F 1/134309; G02F 2201/121; G02F 2201/123; G02F 1/13338; G02F 1/133512; G02B 27/1006; G02B 27/283; G02B 26/02; G02B 27/1046; G02B 27/143; G02B 27/144; G02B 27/145; G02B 27/149; G02B 27/1053; G02B 27/1073; G02B 27/142; G02B 27/0172;
(Continued)

(56) References Cited

U.S. PATENT DOCUMENTS 8,654,343 B2 * 2/2014 Awatsuji ................ G01B 9/021
356/495
8,896,730 B2 * 11/2014 Fossum .................. H04N 9/045
348/222.1
(Continued)

OTHER PUBLICATIONS

Yamaguchi, Phase-shifting digital holography, Optics Letters, Aug. 15, 1997, 1268-1270, vol. 22, No. 16.
(Continued)

*Primary Examiner* — Dave Czekaj
*Assistant Examiner* — Kehinde Abimbola
(74) *Attorney, Agent, or Firm* — Freestone Intellectual Property Law PLLC; Aaron J. Visbeek

(57) ABSTRACT

A co-located imaging and display pixel includes an image pixel having a photosensitive element and a display pixel co-located with the image pixel. An optical transformation engine is coupled between the image pixel and the display pixel. The optical transformation engine is configured to modulate an amplitude of display light emitted by the display pixel in response to receiving an imaging signal generated by the photosensitive element of the image pixel.

20 Claims, 13 Drawing Sheets

(51) Int. Cl.
  *G03H 1/08* (2006.01)
  *G09G 3/20* (2006.01)
  *G02F 1/13* (2006.01)
(52) U.S. Cl.
  CPC ............ *G03H 1/2294* (2013.01); *G09G 3/20* (2013.01); *G02F 1/13* (2013.01); *G03H 2001/0088* (2013.01); *G03H 2225/12* (2013.01); *G03H 2225/22* (2013.01); *G03H 2225/31* (2013.01); *G03H 2225/32* (2013.01); *G03H 2225/55* (2013.01); *G09G 2300/023* (2013.01); *G09G 2300/0857* (2013.01); *G09G 2310/0291* (2013.01); *G09G 2360/14* (2013.01); *G09G 2360/148* (2013.01)
(58) Field of Classification Search
  CPC ........... H01L 27/1203; H01L 27/14609; H01L 27/14621; H01L 27/14627; H01L 27/14634; H01L 27/14643; H01L 27/14656; H01L 21/67144; H04N 5/2256; H04N 5/332; H04N 5/353; H04N 5/35536; H04N 5/35572
  See application file for complete search history.

(56) References Cited

U.S. PATENT DOCUMENTS

| | | | | |
|---|---|---|---|---|
| 9,201,397 | B2* | 12/2015 | Awatsuji | G01B 11/24 |
| 9,503,692 | B2* | 11/2016 | Morita | A61B 1/00009 |
| 9,628,732 | B2* | 4/2017 | Velichko | H04N 5/369 |
| 9,730,649 | B1* | 8/2017 | Jepsen | A61B 5/745 |
| 10,001,405 | B2* | 6/2018 | Awatsuji | G01B 11/24 |
| 2005/0030603 | A1* | 2/2005 | Takemori | G03H 1/02 |
| | | | | 359/28 |
| 2005/0270530 | A1* | 12/2005 | Wada | G03B 17/18 |
| | | | | 356/364 |
| 2009/0115921 | A1* | 5/2009 | Fujinoki | G11B 7/1267 |
| | | | | 349/2 |
| 2010/0051785 | A1* | 3/2010 | Dai | H01L 27/14625 |
| | | | | 250/208.1 |
| 2010/0315638 | A1* | 12/2010 | Goohs | G01N 21/274 |
| | | | | 356/337 |
| 2011/0205409 | A1* | 8/2011 | Fossum | H04N 9/045 |
| | | | | 348/272 |
| 2011/0292402 | A1* | 12/2011 | Awatsuji | G01B 9/021 |
| | | | | 356/495 |
| 2012/0220840 | A1* | 8/2012 | Morita | A61B 1/00009 |
| | | | | 600/317 |
| 2013/0100333 | A1* | 4/2013 | Awatsuji | G03H 1/0443 |
| | | | | 348/335 |
| 2013/0170785 | A1* | 7/2013 | Gao | G02F 1/093 |
| | | | | 385/8 |
| 2013/0301093 | A1* | 11/2013 | Awatsuji | G01B 11/24 |
| | | | | 359/22 |
| 2014/0028804 | A1* | 1/2014 | Usuda | G01C 11/06 |
| | | | | 348/47 |
| 2014/0267598 | A1* | 9/2014 | Drouin | G03H 1/0005 |
| | | | | 348/40 |
| 2015/0054973 | A1* | 2/2015 | Velichko | H04N 5/369 |
| | | | | 348/218.1 |
| 2016/0061656 | A1* | 3/2016 | Awatsuji | G01B 11/24 |
| | | | | 250/208.1 |
| 2018/0070891 | A1* | 3/2018 | Jepsen | A61B 5/745 |
| 2018/0074458 | A1* | 3/2018 | Tsang | G03H 1/0841 |
| 2019/0258061 | A1* | 8/2019 | Solomon | G02B 27/0172 |

OTHER PUBLICATIONS

Dovhaliuk, Review of digital holography reconstruction methods, Thirteenth International Conference on Correlation Optics, Jan. 2018.

* cited by examiner

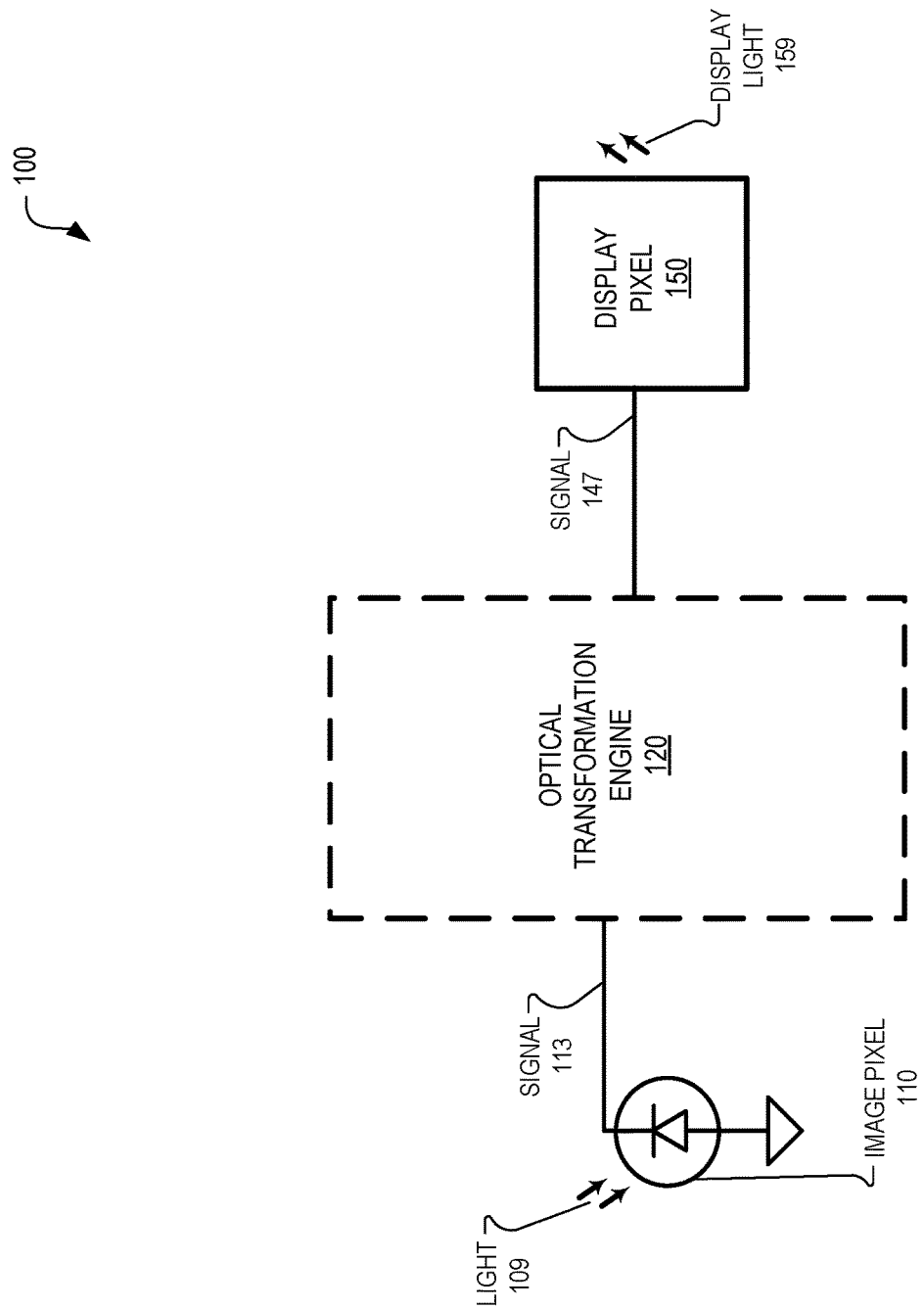

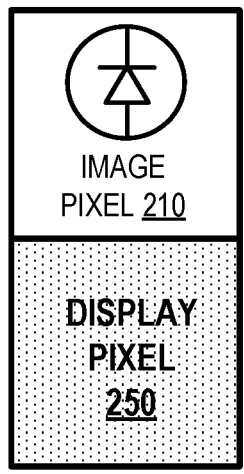
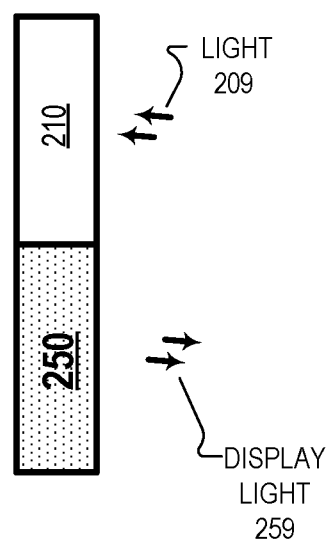
FIG. 2A  FIG. 2B
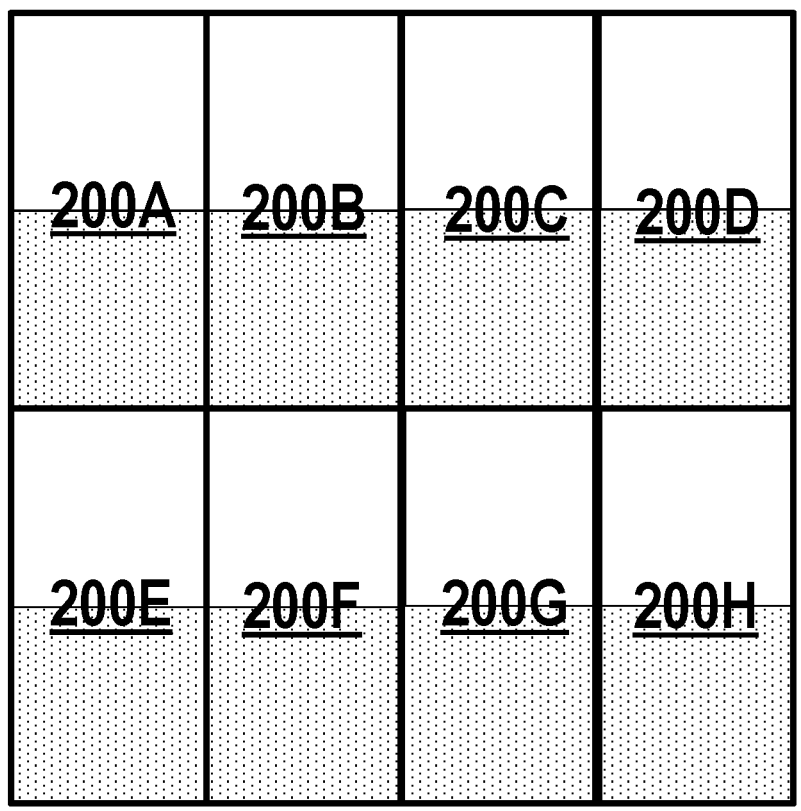
FIG. 2C

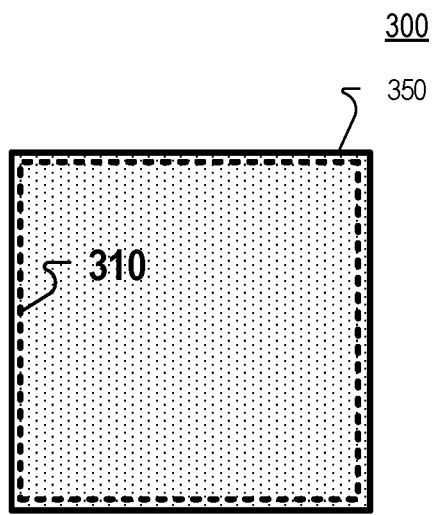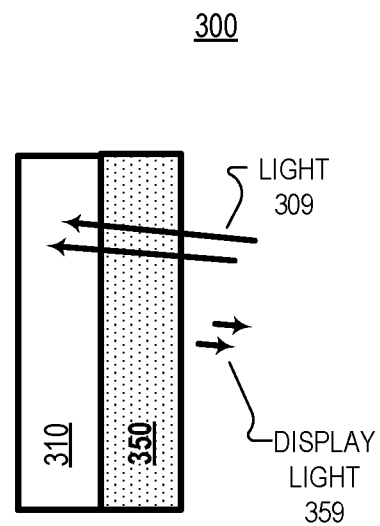
FIG. 3A     FIG. 3B
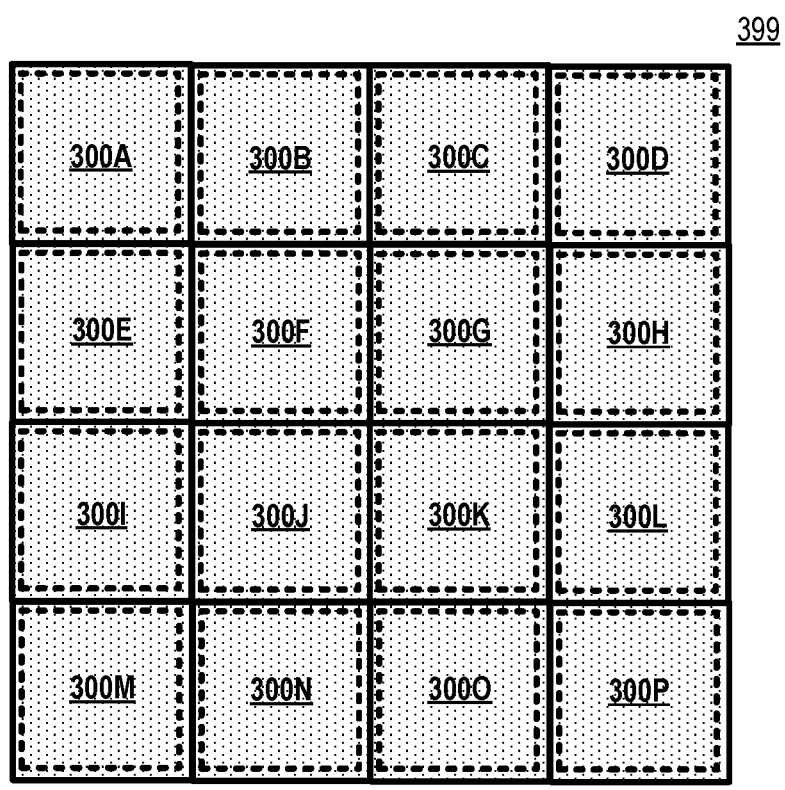
FIG. 3C

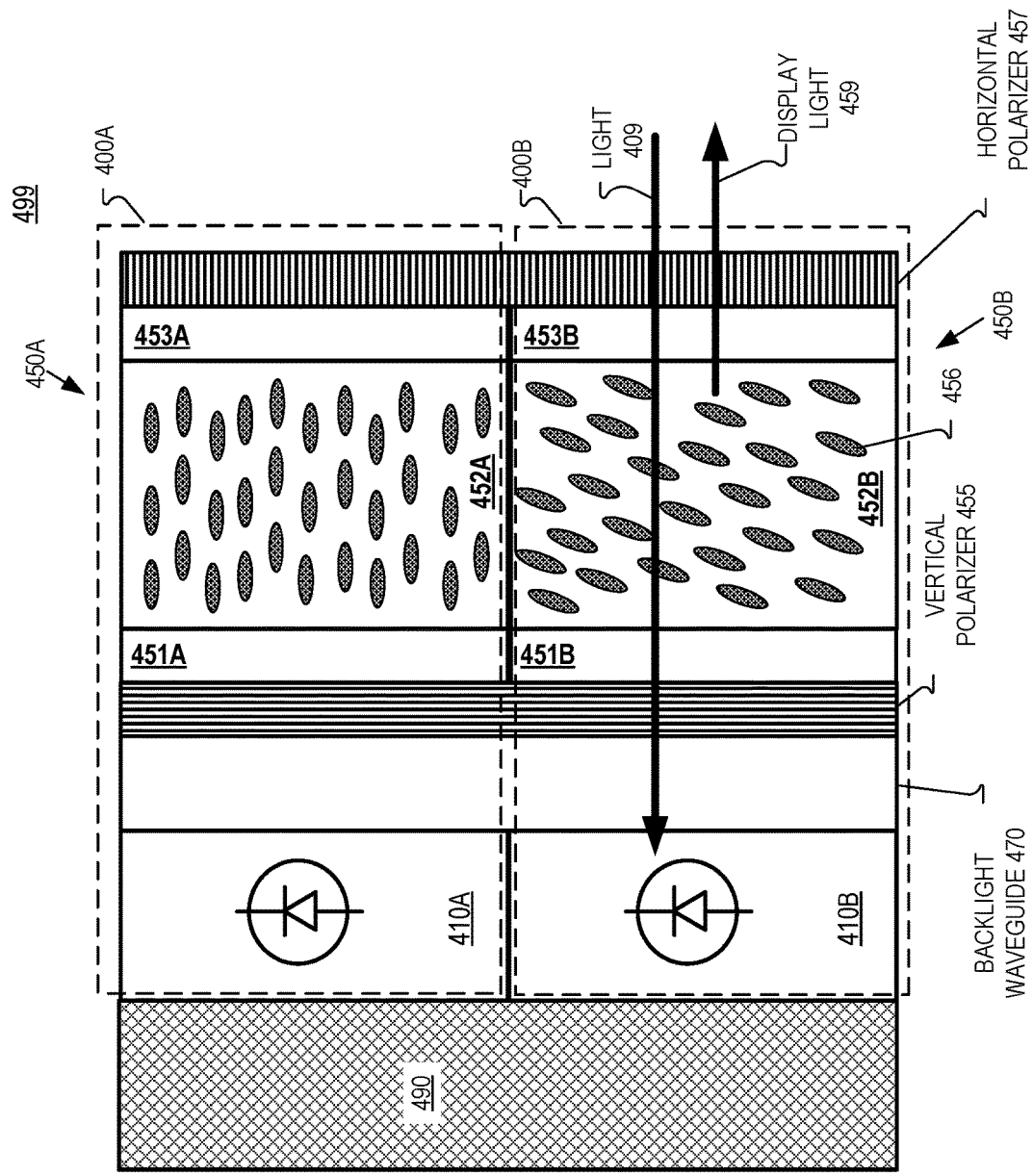

CO-LOCATED IMAGING AND DISPLAY PIXEL

CROSS-REFERENCE TO RELATED APPLICATIONS

This application claims priority to U.S. provisional Application No. 62/509,704 filed May 22, 2017, which is hereby incorporated by reference.

BACKGROUND INFORMATION

Imaging devices are used in contexts such as healthcare, navigation, and security, among others. Imaging systems often measure radio waves or light waves to facilitate imaging. Traditional techniques of measuring light waves have included using photodiodes or image sensors to measure incident light. In these traditional techniques, the intensity of the light is measured.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 1 illustrates an example optical transformation engine configured to modulate a display pixel in response to an imaging signal generated by an image pixel, in accordance with an embodiment of the disclosure.

FIGS. 2A-2C illustrate co-located imaging and display pixels, in accordance with an embodiment of the disclosure.

FIGS. 3A-3C illustrate a co-located imaging and display pixels having an image pixel configured to receive incident imaging light through the display pixel, in accordance with an embodiment of the disclosure.

FIG. 4 illustrates a side view of device that includes a backplane layer and co-located imaging and display pixels that include liquid crystal, in accordance with an embodiment of the disclosure.

DETAILED DESCRIPTION

Figure 5:
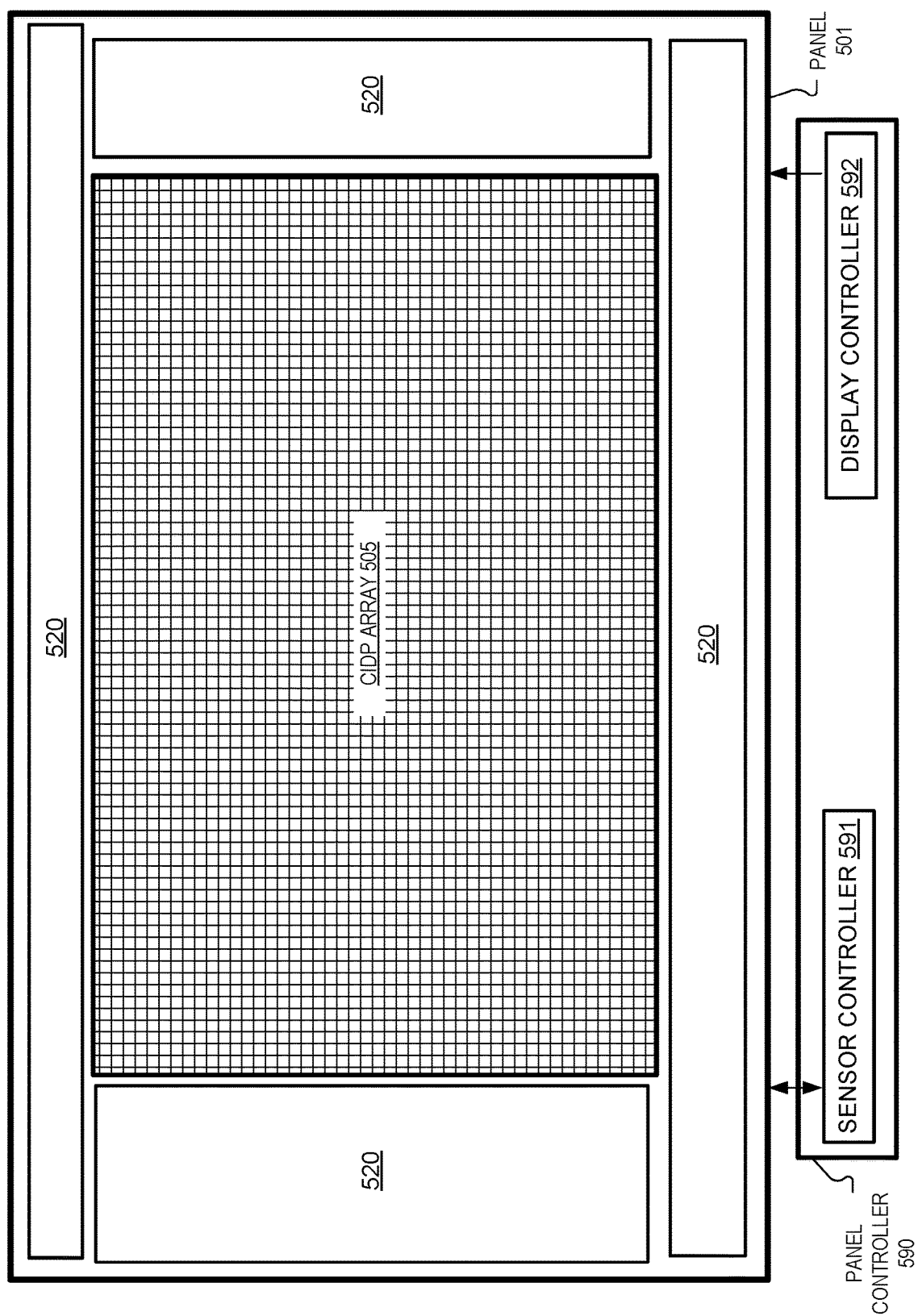
FIG. 5 illustrates a block diagram of a device including a co-located imaging and display pixel array and associated edge circuitry arranged around the edges of the co-located imaging and display pixels array, in accordance with an embodiment of the disclosure.

Embodiments of a system and device that include a co-located imaging and display pixel and associated methods of operation are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise.

Embodiments of this disclosure include a co-located imaging and display pixel. A panel may include an array of co-located imaging and display pixels that are utilized to measure image light and/or generate an optical transformation. In one embodiment, an optical transformation engine is configured to drive a display pixel in response to an image pixel that is co-located with the display pixel. When a panel includes an array of co-located imaging and display pixels, the panel may receive image light and generate a reconstruction (in reverse) of the received image light by measuring the image light with the image pixels and emitting the reconstructed version of the image light with the display pixels based on an optical transformation performed by the optical transformation engine.

In one embodiment of the disclosure, the image pixel of the co-located imaging and display pixel is configured to receive the image light through the display pixel. The display pixel may include liquid crystal. The display pixel may be modulated such that the orientations of the liquid crystal are changed for different measurements of the image light. Using this technique, the phase of the imaging light can be determined. Thus, more information about the imaging light may be calculated. The phase and/or intensity data may be used to generate a three-dimensional composite image, in some embodiments. The phase and/or intensity data may be used to calculate a hologram that can be driven onto the display pixels of the panel to generate the reconstruction of the imaging light.

Embodiments of the disclosure may be utilized in imaging devices for medical, sensing, or navigation contexts. In one particular embodiment in the medical context, an infrared image signal is received by the image pixels of the panel having co-located imaging and display pixels. The infrared image signal is exiting body tissue (e.g. brain or abdomen). The display pixels of the panel are then driven to emit a reconstruction of the received infrared image signal to focus/direct infrared light back into a voxel of tissue along the path (in reverse) that the infrared image signal propagated along to arrive at the image pixels. Illuminating the voxel with the reconstructed infrared light allows for a subsequent measurement of the infrared light that is absorbed/scattered by the particular voxel. These and other embodiments are described in more detail below with respect to FIGS. 1-13.

FIG. 1 illustrates an example co-located imaging and display pixel 100, in accordance with an embodiment of the disclosure. Co-located imaging and display pixel (CIDP) 100 includes an image pixel 110, an optical transformation engine 120, and a display pixel 150. Image pixel 110 includes a photosensitive element. Image pixel 110 may include a pinned photodiode that includes silicon to sense/measure incident image light 109 over an accumulation period. Image pixel 110 may be fabricated using complementary metal-oxide-semiconductor (CMOS) techniques. An imaging signal 113 representative of the measured image light 109 over the accumulation period is received by optical transformation engine 120. In some embodiments, image pixel 110 may include a filter that passes particular infrared light band(s) and rejects all other light.

Optical transformation engine 120 is coupled between image pixel 110 and display pixel 150. Optical transformation engine 120 is configured to modulate an amplitude of display light 159 emitted from display pixel 150 in response to receiving an imaging signal 113 generated by the photosensitive element of image pixel 110. In FIG. 1, optical transformation engine 120 drives a modulation signal 147 to modulate the emission of display light 159 by display pixel 150. In one embodiment, the modulation signal 147 is a voltage across two indium tin oxide (ITO) layers having a liquid crystal cell disposed between them. Modulating the voltage across the ITO layers may change the orientation of liquid crystals in the liquid crystal cell, which polarizes light to be aligned (emitted as display light) or misaligned (not emitted as display light) with a polarizer included in the display pixel 150. In the illustrated embodiment, optical transformation engine 120 is "in-pixel" circuitry that is co-located with image pixel 110 and display pixel 150. In other embodiments, optical transformation engine 120 is not "in-pixel" and is located on the edge of a panel that includes an array of CIDPs 100, for example. Various embodiments of optical transformation engine will be described in more detail below.

FIGS. 2A-2C illustrate co-located imaging and display pixels, in accordance with an embodiment of the disclosure. FIG. 2A illustrates a front view of an example CIDP 200 that includes an image pixel 210 and a display pixel 250. Image pixel 210 and display pixel 250 may have the characteristics of image pixel 110 and display pixel 150, respectively. In FIG. 2A, display pixels 250 and image pixel 210 are illustrated as adjacent nearest neighbor.

FIG. 2B illustrates a side view of CIDP 200. Image pixel 210 receives light 209 in a reception plane that is substantially parallel to an emission plane that display pixel 250 emits display light 259. In some embodiments, image pixels 210 receive light 209 in a reception plane that is offset from an emission plane that display pixel 250 emits display light 259.

FIG. 2C illustrates a front view of a portion of an example panel 299 that includes an array of CIDPs 200A-200H. In some embodiments, a panel may have hundreds, thousands, or millions of CIDPs 200 arranged to measure incident light and emit display light. It is understood that the shape of the image pixel 210 and the display pixel 250 may be different in different embodiments. For example, the image pixel 210 and the display pixel 250 may be shaped as rectangles. The image pixel 210 may be smaller than the display pixel 250 in some embodiments. The display pixel 250 may be smaller than the image pixel 210 in some embodiments.

In one embodiment (not illustrated), the image pixels 210 and display pixel 250 are arranged in a checkerboard pattern where the image pixels 210 would be disposed on the black portions of the checkerboard pattern and the display pixels 250 would be arranged on the white portions of the checkerboard pattern. Other arrangements are possible.

FIGS. 3A-3C illustrate an example CIDP 300 having an image pixel 310 configured to receive incident imaging light through the display pixel 350, in accordance with an embodiment of the disclosure. FIG. 3A illustrates a front view of an example CIDP 300 that includes an image pixel 310 and a display pixel 350. Image pixel 310 and display pixel 350 may have the characteristics of image pixel 110 and display pixel 150, respectively.

FIG. 3B illustrates that image pixel 310 is disposed under/behind display pixel 350 and configured to receive image light 309 through display pixel 350, in FIG. 3A.

FIG. 3C illustrates a front view of a portion of a panel 399 that includes an array of CIDPs 300A-300P. In some embodiments, a panel may have hundreds, thousands, or millions of CIDPs 300 arranged to measure incident light and emit display light. It is understood that the shape of the image pixel 310 and the display pixel 350 may be different in different embodiments. For example, the image pixel 310 and the display pixel 350 may be shaped as rectangles. The image pixel 310 may be smaller than the display pixel 350 in some embodiments. The display pixel 350 may be smaller than the image pixel 310 in some embodiments. Although not illustrated in FIGS. 2A-3C, embodiments of the disclosure may include arrangements where there may be two or more display pixels for every image pixel or two or more image pixels for every display pixel.

FIG. 4 illustrates a side view of an example device 499 that includes a backplane layer 490 and CIDPs 400A and 400B that include liquid crystal, in accordance with an embodiment of the disclosure. Each CIDP 400 includes an image pixel 410 and an example display pixel 450 that includes a liquid crystal cell 452 disposed between conductive layer 451 and 453. Conductive layers 451 and 453 may include ITO or other transparent conductive oxides. Device 499 includes a backlight waveguide or lightpipe 470. An LED or other emitter may emit light into backlight waveguide 470. Backlight waveguide 470 may be partially coated with a reflective surface or use principles of total internal reflection coupled with gratings to direct light generated by the backlight into the display pixels 450. The light generated by the backlight is linearly polarized by vertical polarizer 455, in the illustrated example. In one embodiment, when there is a voltage applied across conductive layers 451A and 453A, the light from the backlight is not emitted because the light is not rotated to bypass horizontal polarizer 457. When no voltage is applied across conductive layers 451B and 453B, the light from the backlight may be emitted as display light 459 because the orientation of the liquid crystals 456 rotates the light to bypass horizontal polarizer 457 as display light 459.

In FIG. 4, light 409 is received by image pixel 410B through display pixel 450B. Liquid crystal cell 452B may need to be modulated (e.g. a particular voltage across conductive layers 451B and 453B) to allow the image light 409 to propagate through display pixel 450B to become incident on image pixel 410B for measurement.

In the embodiment illustrated in FIG. 4, circuitry and processing logic of optical transformation engines associated with each CIDP 400 may be included in backplane layer 490. Vias, including through-silicon vias (TSV) may be utilized to access nodes of image pixel 410 and conductive layers 451 and 453 to facilitate measuring light and modulating the display pixels 450. Having the circuitry and processing logic of optical transformation engines disposed so close to each CIDP 400 may increase the processing speed and/or preserve the signal integrity. In embodiments where each CIDP has its own dedicated optical transformation engine, the optical transformation engine disposed in backplane 490 may be considered "in-pixel" because of its extremely close proximity to image pixel 410 and the display pixel 450.

FIG. 5 illustrates a block diagram of a device including a CIDP array and associated edge circuitry arranged around the edges of the CIDP array, in accordance with an embodiment of the disclosure. In contrast to circuitry and processing logic being disposed in a backplane layer 490 (FIG. 4), the embodiment of FIG. 5 illustrates circuitry and processing logic 520 (e.g. optical transformation engines 120) associated with CIDPs disposed as edge circuitry. Panel 501 in FIG. 5 includes a CIDP array 505 that includes a plurality of CIDPs such as CIDP 200, 300, or 400. A panel controller 590 includes sensor controller 591 and display controller 592, which may be coupled to panel 501 to coordinate driving images (including holographic images) onto the display pixels of CIDP array 505.

Figure 6:
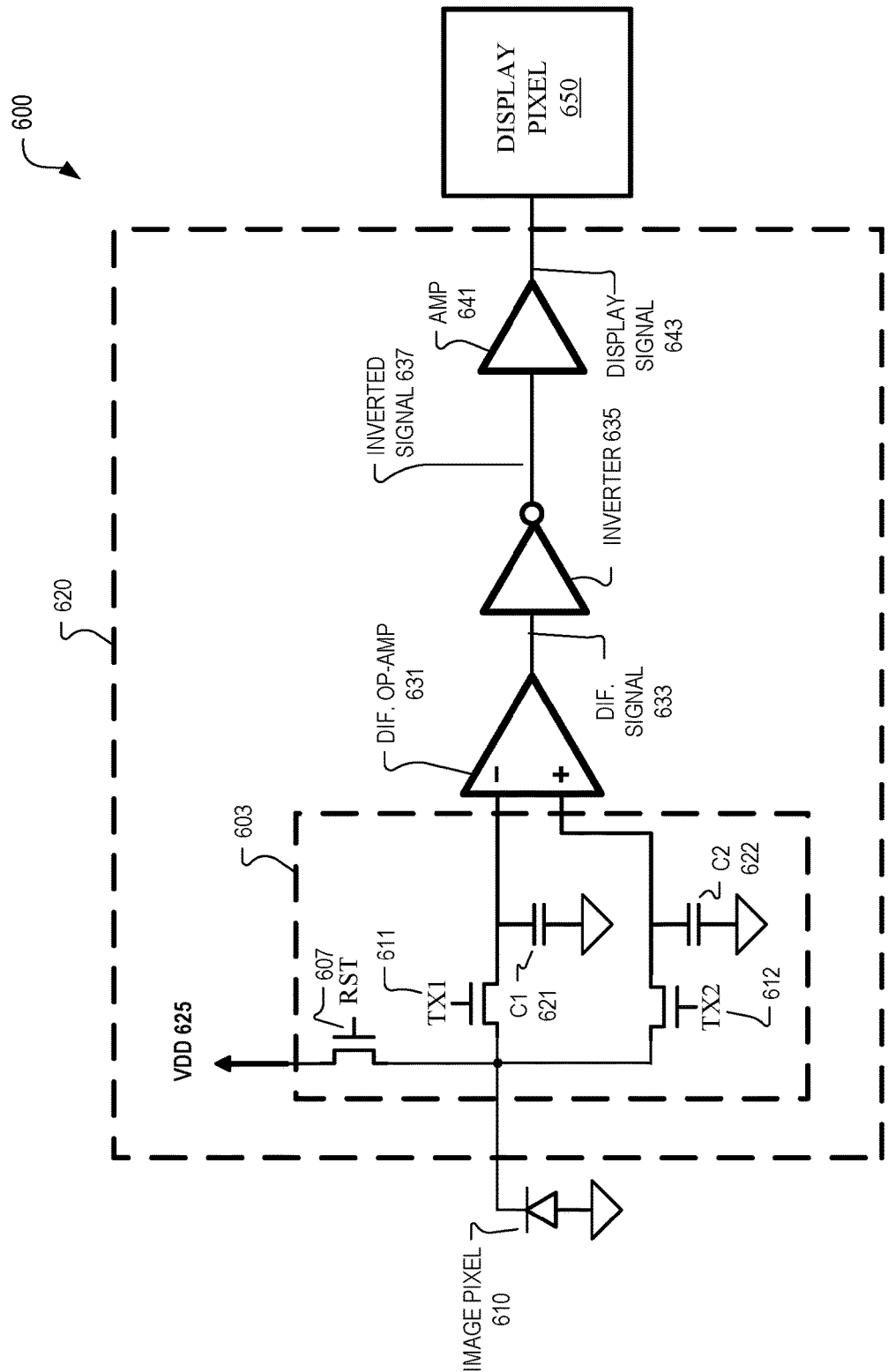
FIG. 6 illustrates an example optical transformation engine having in-pixel memory, in accordance with an embodiment of the disclosure.

FIG. 6 illustrates an example optical transformation engine 620 having in-pixel memory, in accordance with an embodiment of the disclosure. CIDP 600 includes an image pixel 610, a sampling stage 603, a differential op-amp 631, an inverter 635, an optional amplifier 641, and a display pixel 650. Image pixel 610 and display pixel 650 may have the characteristics of image pixel 110 and display pixel 150, respectively. In operation, image pixel 610 may be reset by activating transistor 607 by signaling the RST line to reset the voltage on image pixel 610 to VDD 625. After the image pixel 610 is reset, first incident light may be received by image pixel 610 during a first accumulation period. The first incident light may be reflected by a diffuse medium such as tissue. After the accumulation period, transistor 612 may be activated by signaling TX2 to transfer first image charge accumulated in image pixel 610 during the first accumulation period to be stored across capacitor C2 622 at the positive input of differential op-amp 631. Transistor 612 is then deactivated and then transistor 607 is activated to reset image pixel 610 for a second accumulation period. After the image pixel 610 is reset for the second accumulation period, second incident light may be received by image pixel 610 during the second accumulation period. The second incident light may be reflected by the diffuse medium. After the second accumulation period, transistor 611 may be activated by signaling TX1 to transfer second image charge accumulated in image pixel 610 during the second accumulation period to be stored across capacitor C1 622 at the negative input of differential op-amp 631. Differential op-amp 631 then generates a differential signal 633 representing the difference between the first image charge from the first accumulation period and the second image charge from the second accumulation period. To reset sampling block 603, the RST, TX1, and TX2 lines may be signaled simultaneously so that an image charge stored across capacitors C1 621 and C1 622 are reset to VDD 625.

Other differential circuits besides a differential op-amp may be used in place of differential op-amp 631. Likewise, sampling block 603 is just one example of having in-pixel memory for storing a first image charge for comparison to a second image charge. Inverter 635 generates an inversion of differential signal 633. Inverter 635 in FIG. 6 is symbolic of the different inverter circuits that could be used by those skilled in the art to generate an inverted signal 637. The inverted signal 637 may be optionally amplified by amplifier 641. In a different embodiment, optional amplifier 641 may be coupled between the differential op-amp 631 and inverter 635. Display pixel 650 is coupled to receive the display signal 643 and an amplitude of light emitted from display pixel 650 may be modulated in response to receiving the display signal 643.

In one embodiment, inverter 635 is removed from CIDP 600 and the image charge stored on capacitor C1 621 is coupled to the positive output of differential op-amp 631 while the second image charge stored across capacitor C2 622 is coupled to the negative output of differential op-amp 631. This configuration effectively makes the differential signal 633 into inverted signal 637 without inverter 635. Using an all analog optical transformation engine 620 may increase the speed of generating the display signal 643 in order to modulate display pixel 650 in response to measurements of image pixel 610.

Figure 7:
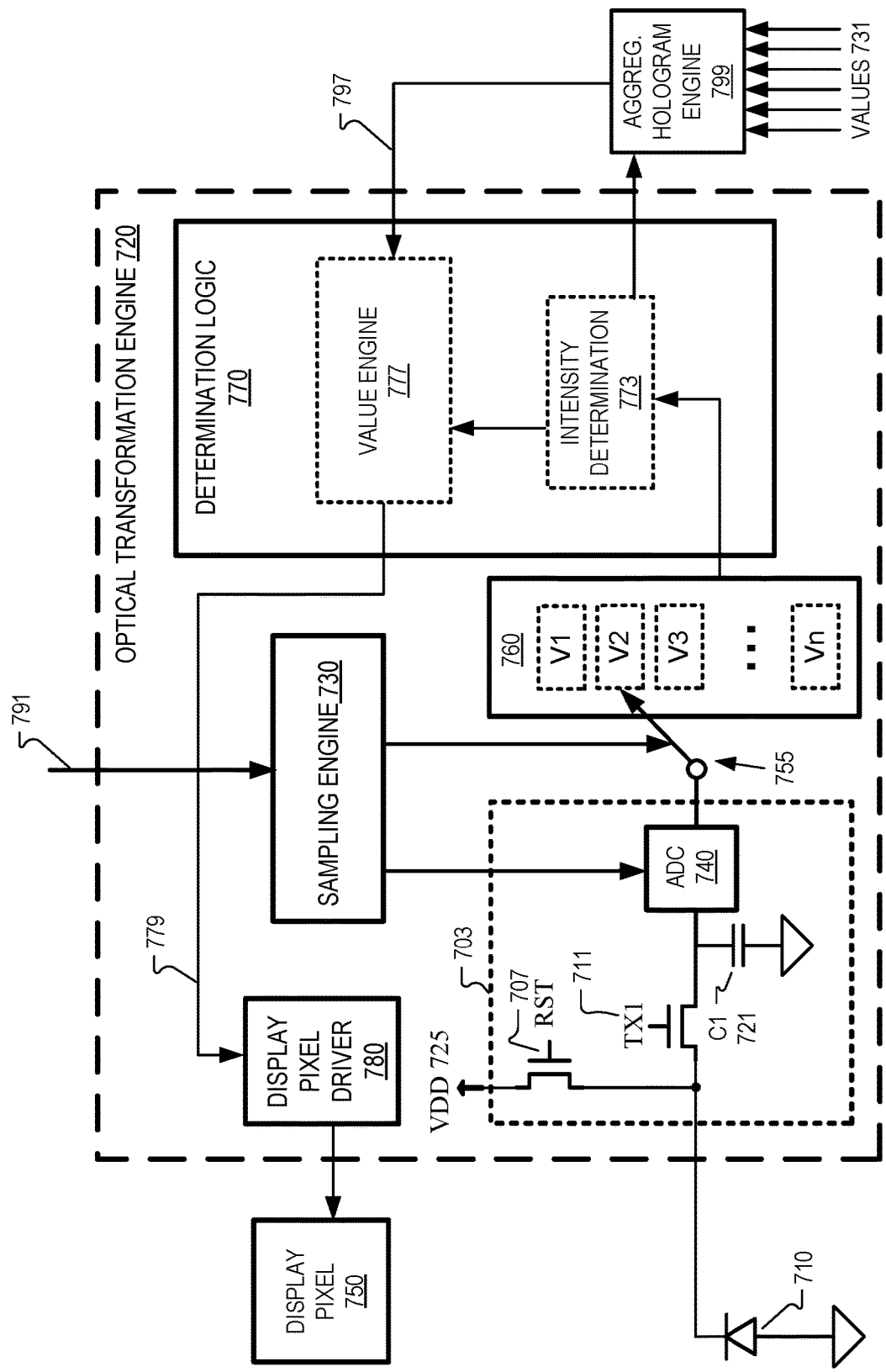
FIG. 7 illustrates an example optical transformation engine that samples multiple accumulation periods of an image pixel and stores imaging values in a memory, in accordance with an embodiment of the disclosure.

FIG. 7 illustrates an example optical transformation engine 720 that samples multiple accumulation periods of an image pixel 710 and stores imaging values in a memory, in accordance with an embodiment of the disclosure. FIG. 7 includes optical transformation engine 720, display pixel 750, and image pixel 710. Optical transformation engine 720 includes a transistor 707, a transistor 711, a capacitor C1 721, and an analog-to-digital converter (ADC) 740. In operation, image pixel 710 may be reset by activating transistor 707 by signaling the RST line to reset the voltage on image pixel 710 to VDD 725. After the image pixel 710 is reset, first incident light may be received by image pixel 710 during a first accumulation period. The first incident light may be reflected/scattered by a diffuse medium such as tissue. After the accumulation period, transistor 711 may be activated by signaling TX1 to transfer first image charge accumulated in image pixel 710 during the first accumulation period to be stored across capacitor C1 721 at the input of ADC 740. Transistor 711 may be deactivated (open circuit) while ADC 740 samples the voltage across capacitor C1 721 that is representative of the first image charge. ADC 740 may store the measured voltage as a digital value in memory 760. The memory location in memory 760 may be selected by memory selector 755.

To measure a second accumulation period, transistor 707 may be activated to reset image pixel 710 to VDD 725. Transistor 711 may also be activated at the same time transistor 707 is reset so that the voltage across capacitor C1 721 is also reset to VDD 725. Once the image pixel is reset, incident light may generate an image charge on image pixel 710 and that second image charge is measured by ADC 740 and stored in a different memory location of memory 760 using a similar process. In the illustrated embodiment, memory 760 stores voltage measurements V0, V1, V2 through Vn, where n is the number of accumulation periods. In some embodiments, only two accumulation periods are measured. In some embodiments, three accumulation periods are measured. Four or more accumulation periods are measured by ADC 740 and stored in memory 760, in some embodiments. In one embodiment, the accumulation periods are for an equal time duration.

In some embodiments, an illumination signal 791 may be received by sampling engine 730. Sampling engine 730 is coupled to ADC 740 and memory 760 to direct the sampling of the image charges and the storing of the measurement to memory 760. Sampling engine may direct the sampling and storing in response to the illumination signal 791. In some embodiments of the disclosure, an illumination light source may illuminate a diffuse medium with image light for measurement by image pixel 710 and illumination signal 791 may indicate that the illumination light source has been activated.

The illustrated example optical transformation engine 720 includes determination logic 770 that includes an intensity determination module 773 and a value engine 777. Intensity determination module 773 receives the image charge values stored in memory 760. Intensity determination module may average the image charge values to determine an intensity value and provides the intensity value to value engine 777. Value engine may send a modulation signal 779 to display pixel driver 780 and display pixel driver 780 may modulate display pixel 750 according to the modulation signal 779. Display pixel driver 780 may modulate a voltage across ITO layers of a liquid crystal cell in order to modulate the emitted display light in response to the modulation signal 779, for example.

Optionally, intensity determination module 773 may provide its calculated intensity value to aggregate hologram engine 799. Aggregate hologram engine 799 receive intensity values 731 from other image pixels in a panel. Based at least in part on the plurality of intensity values, aggregate hologram engine 799 may generate a hologram value 797 to provide to value engine 777. The hologram value 797 may be a display value that is part of a larger hologram to be driven onto display pixels of the panel, for example. Value engine 777 may generate the modulation signal 779 based on the hologram value 797 generated by aggregate hologram engine 799.

Figure 8:
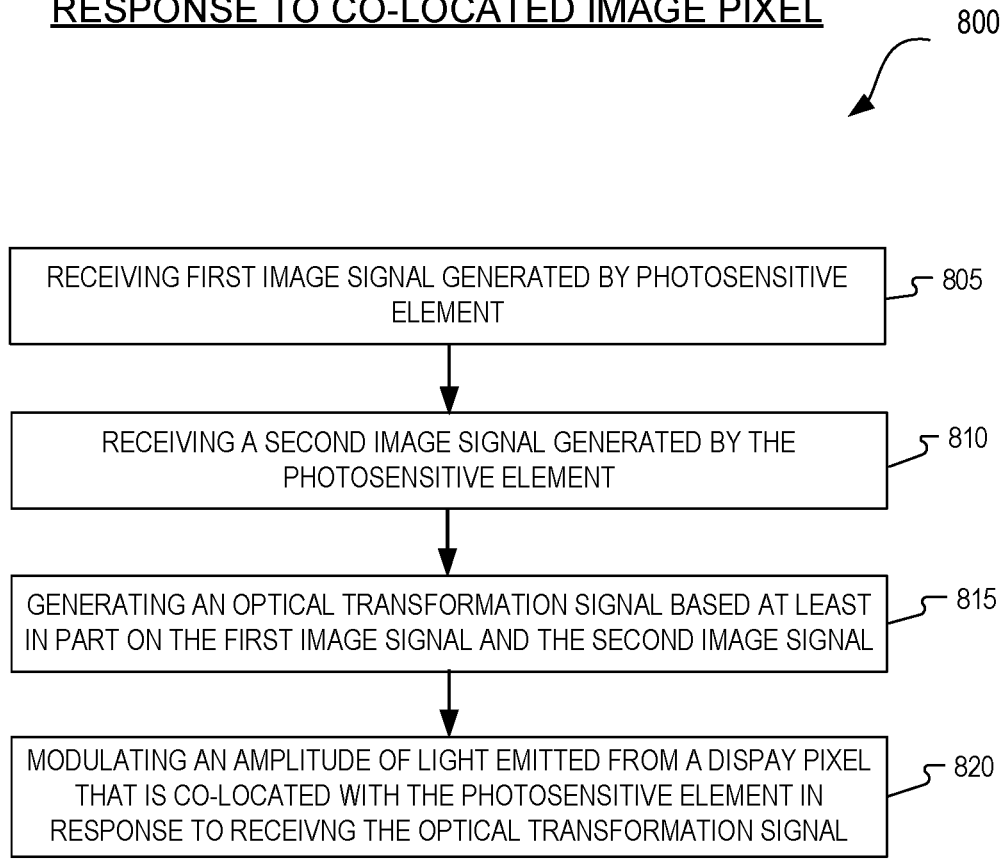
FIG. 8 illustrates a flowchart illustrating an example process of modulating a display pixel in response to measuring image light from a co-located image pixel, in accordance with an embodiment of the disclosure.

FIG. 8 illustrates a flowchart illustrating an example process 800 of modulating a display pixel in response to measuring image light from a co-located image pixel, in accordance with an embodiment of the disclosure. The order in which some or all of the process blocks appear in process 800 should not be deemed limiting. Rather, one of ordinary skill in the art having the benefit of the present disclosure will understand that some of the process blocks may be executed in a variety of orders not illustrated, or even in parallel.

In process block 805, a first image signal is generated by a photosensitive element (e.g. image pixel 110). The first image signal may be generated in a first accumulation period.

In process block 810, a second image signal is generated by the photosensitive element. The second image signal may be generated in a second accumulation period subsequent to the first accumulation period.

In process block 815, an optical transformation signal (e.g. signal 147) is generated based at least in part on the first image signal and the second image signal.

In process block 820, an amplitude of light (e.g. display light 159) emitted from a display pixel (e.g. display pixel 150) is modulated in response to receiving the optical transformation signal.

In one embodiment of process 800, generating the optical transformation signal includes generating a difference signal (e.g. difference signal 663) representative of a difference between the first image signal and the second image signal and generating an inverted signal (e.g. 637) by inverting the difference signal. In this case, the optical transformation signal of process block 815 may be represented by the inverted signal.

In one embodiment of process 800, generating the optical transformation signal includes converting the first image signal to a first digital value and storing the first digital value in a memory (e.g. memory 760) and converting the second image signal to a second digital value and storing the second digital value in the memory at a different memory location.

Figure 9A:
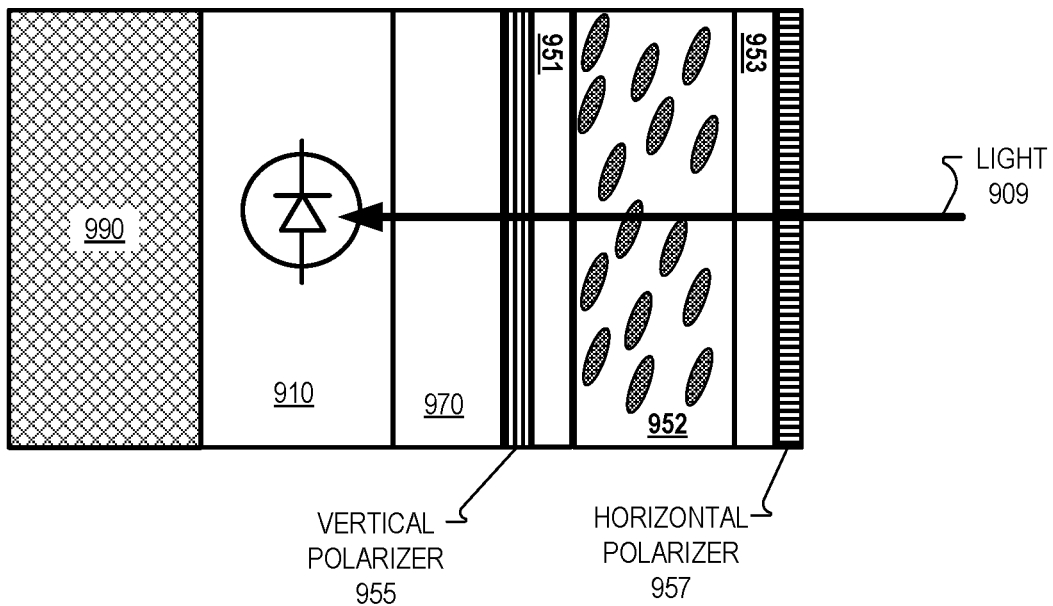
FIGS. 9A and 9B illustrates an example co-located imaging and display pixel to facilitate measurement of incident light, in accordance with an embodiment of the disclosure.
Figure 9B:
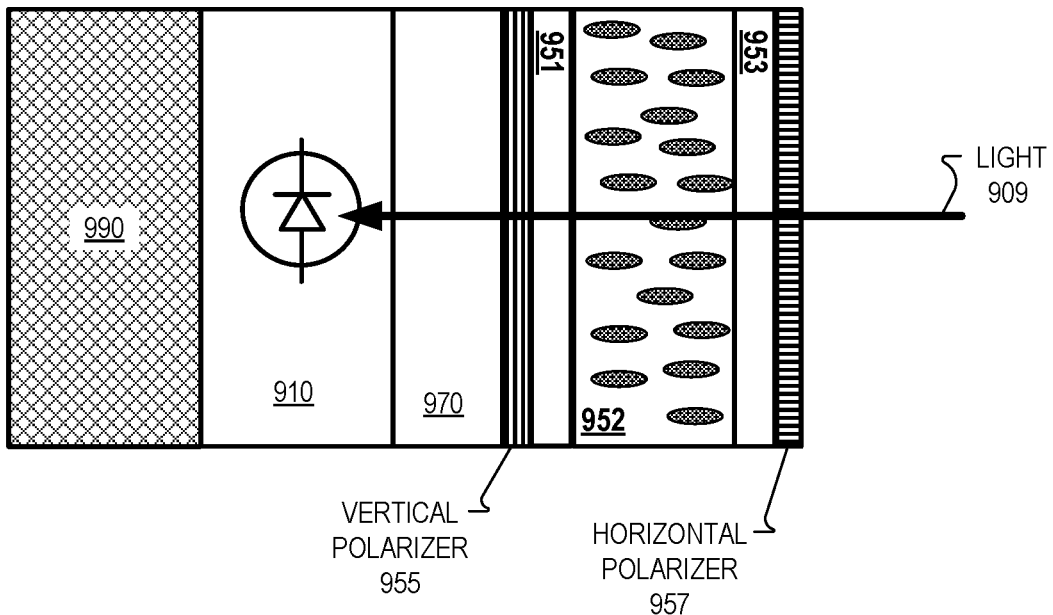

FIGS. 9A and 9B illustrates an example co-located imaging and display pixel to facilitate measurements incoming incident light, in accordance with an embodiment of the disclosure. In FIG. 9A, liquid crystals in liquid crystal cell 952 have a first orientation corresponding with a first voltage across layers 951 and 953. In FIG. 9B, liquid crystals in liquid crystal cell 952 have a second orientation corresponding with a second voltage across layers 951 and 953. The birefringence characteristics of liquid crystal impart a different phase modulation to incident light 909 when the liquid crystals are driven to different orientations. Therefore, the intensity measurements by image pixels 410 may be different for different orientation of liquid crystal cell 952.

Figure 10:
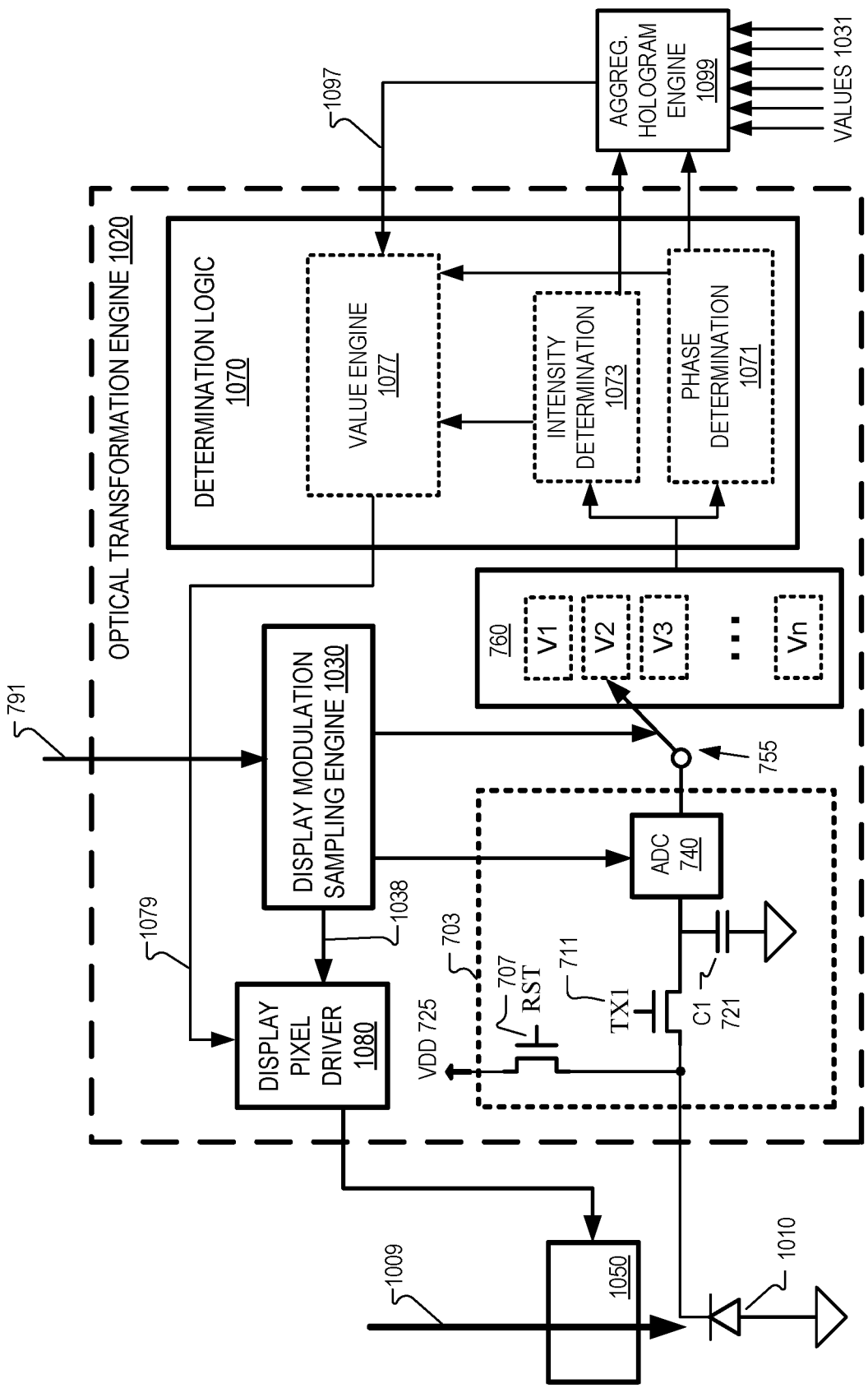
FIG. 10 illustrates an example optical transformation engine that measures imaging values of incident light propagating through a display pixel that includes liquid crystal having an orientation controlled by the optical transformation engine, in accordance with an embodiment of the disclosure.

FIG. 10 illustrates an example optical transformation engine 1020 that measures imaging values of incident light 1009 propagating through display pixel 1050 that includes liquid crystal having an orientation controlled by the optical transformation engine 1020, in accordance with an embodiment of the disclosure. The embodiment of FIG. 10 will use a CIDP having a similar configuration as CIDPs 300 and 400 where the image pixel receives image light through the display pixel. In FIG. 10, image pixel 1010 receives incident image light 1009 through a liquid crystal cell of display pixel 1050.

In FIG. 10, display modulation sampling engine 1030 provides a modulation signal 1038 to display pixel driver 1080 during the different accumulations. For example, in a first accumulation period, modulation signal 1038 may cause display pixel driver 1080 to drive the liquid crystals of display pixel 1050 to a first orientation. The first orientation of the liquid crystal may cause a phase change of incident image light 1009 of zero. In a second accumulation period, modulation signal 1038 may cause display pixel driver 1080 to drive the liquid crystals of display pixel 1050 to a second orientation. The second orientation of the liquid crystal may cause a phase change of incident image light 1009 of $\pi/2$. In a third accumulation period, modulation signal 1038 may cause display pixel driver 1080 to drive the liquid crystals of display pixel 1050 to a third orientation. The third orientation of the liquid crystal may cause a phase change of incident image light 1009 of $\pi$. In a fourth accumulation period, modulation signal 1038 may cause display pixel driver 1080 to drive the liquid crystals of display pixel 1050 to a fourth orientation. The fourth orientation of the liquid crystal may cause a phase change of incident image light 1009 of $3\pi/2$. Thus, four measurements (e.g. V1, V2, V3, and Vn where n is the numeral 4) in memory 760 may corresponds to measurements of image light 1009 propagating through display pixel 1050.

In FIG. 10, determination logic 1070 includes a value engine 1077, intensity determination module 1073, and phase determination module 1071. Intensity determination module 1073 may function similarly to intensity determination module 773 by averaging the image charge values stored in memory 760 to determine an intensity value and provide that intensity value to value engine 1077. Phase determination module 1071 also receives the image charge values stored in memory 760. Phase determination module 1071 may calculate a phase of incident light 1009 by calculating the arctan of (V4−V2)/(V1−V3). Phase determination module 1071 may then provide the phase value to value engine 1077. Based at least in part on the phase value received from module 1071 and the intensity value received from module 1073, value engine 1077 generates a modulation signal 1079 to send to display pixel driver 1080. Display pixel driver 1080 may modulate display pixel 1050 according to the modulation signal 1079. Display pixel driver 1080 may modulate a voltage across ITO layers of a liquid crystal cell in order to modulate the emitted display light in response to the modulation signal 1079, for example.

Optionally, intensity determination module 1073 may provide its calculated intensity value to aggregate hologram engine 1099 and phase determination module 1071 may also provide its calculated phase value to aggregate hologram engine 1099. Aggregate hologram engine 1099 receive intensity values 1031 (including both phase and intensity values) from other image pixels in a panel. Based at least in part on the plurality of intensity values and phase values, aggregate hologram engine 1099 may generate a hologram value 1097 for providing to value engine 1077. The hologram value 1097 may be a display value that is part of a larger hologram to be driven onto display pixels of the panel, for example. Value engine 1077 may generate the modulation signal 1079 based on the hologram value 1097 generated by aggregate hologram engine 1099.

Using the techniques described in association with FIG. 10, more information (e.g. phase) can be known about the incident light 1009. Hence, a better reconstruction of the incident light 1009 may be generated using display pixels 1050 of a panel, where a holographic pattern is driven onto display pixels 1050 to generate the reconstruction.

Figure 11:
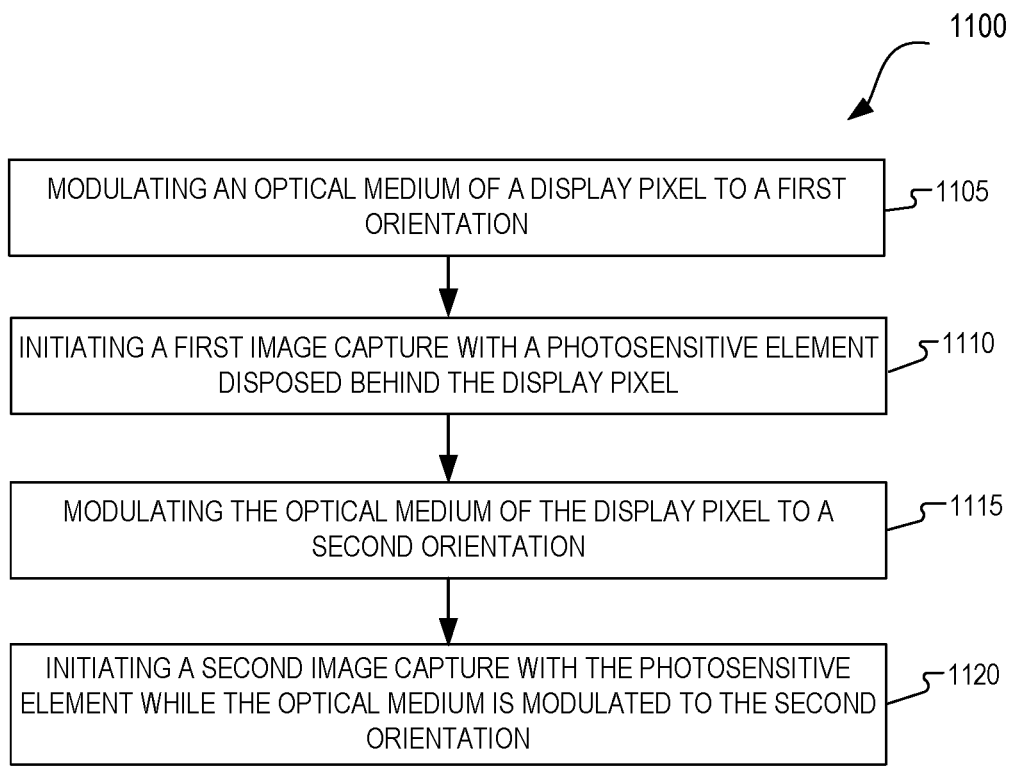
FIG. 11 illustrates a flowchart illustrating an example process of measuring image light through a modulated display pixel, in accordance with an embodiment of the disclosure.

FIG. 11 illustrates a flowchart illustrating an example process 1100 of measuring image light through a modulated display pixel, in accordance with an embodiment of the disclosure. The order in which some or all of the process blocks appear in process 1100 should not be deemed limiting. Rather, one of ordinary skill in the art having the benefit of the present disclosure will understand that some of the process blocks may be executed in a variety of orders not illustrated, or even in parallel.

In process block 1105, an optical medium (e.g. liquid crystal cell) of a display pixel (e.g. pixel 1050) is modulated to a first orientation.

In process block 1110, a first image capture is initiated with a photosensitive element (e.g. image pixel 1010) disposed behind the display pixel. The first image capture measures a first imaging signal of the incident imaging light propagating through the optical medium to the photosensitive element while the optical medium is in the first orientation.

In process block 1115, the optical medium of the display pixel is modulated to a second orientation that is different than the first orientation.

In process block 1120, a second image capture is initiated with the photosensitive element while the optical medium is modulated to the second orientation.

In one embodiment of process 1100, the optical medium is modulated to a driving orientation based at least in part on the first imaging signal and the second imaging signal. For example, the modulation signal 1079 may cause the liquid crystal of the display pixel 1050 to be driven to a driving orientation to emit the proper amount of display light.

In one particular embodiment, process 1100 may further include determining an intensity value of the incident imaging light that includes averaging the first imaging signal and the second imaging signal. A phase value of the incident imaging signal may be determined and a hologram pixel value based at least in part on the intensity value and the phase value may be determined. The driving orientation of the display pixel may be representative of the hologram pixel value.

In one particular embodiment, process 1100 may further include determining an intensity value of the incident imaging light that includes averaging the first imaging signal and the second imaging signal. A phase value of the incident imaging signal may be determined and the phase value and the intensity value are provided to an aggregate hologram engine (e.g. 1099). The aggregate hologram engine is also coupled to receive a plurality of phase and intensity values from a plurality of CIDPs disposed on a panel. An aggregate value (e.g. 1097) may be provided by the aggregate hologram engine. The aggregate value may be determined based at least in part on the intensity value, the phase value, and the plurality of phase and intensity values from the plurality of CIDPs. Modulating the optical medium to the driving orientation may include driving the display pixel to the aggregate value received from the aggregate hologram engine (e.g. 1099).

In an embodiment of process 1100, generating the pixel value includes determining a phase of the incident imaging light based at least in part on the first imaging signal, the second imaging signal, the first orientation of the liquid crystal, and the second orientation of the liquid crystal.

Figure 12:
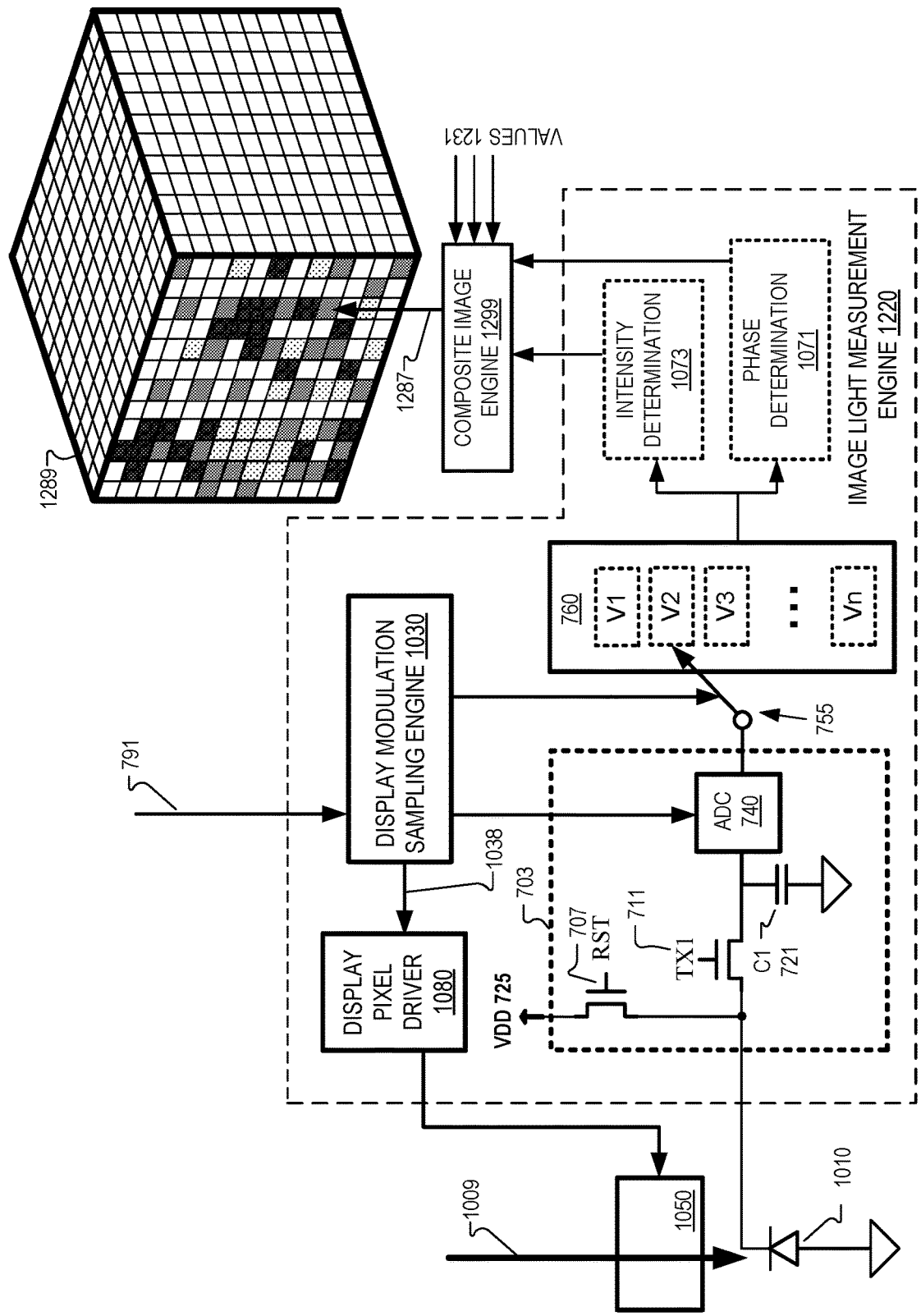
FIG. 12 illustrates an example image light measurement engine for generating a composite image, in accordance with an embodiment of the disclosure.

FIG. 12 illustrates an example image light measurement engine 1220 for generating a composite image 1289, in accordance with an embodiment of the disclosure. FIG. 12 includes display pixel 1050, image pixel 1010, and image light measurement engine 1220. The embodiment illustrated in FIG. 12 is a read-only architecture where display pixel 1050 is utilized to measure incident image light 1009, but display pixel 1050 is not necessarily used to emit display light. Rather, display pixel 1050 may be used to assist in measuring image light 1009 as described in connection with FIG. 10.

For example, in a first accumulation period, modulation signal 1038 may cause display pixel driver 1080 to drive the liquid crystals of display pixel 1050 to a first orientation. The first orientation of the liquid crystal may cause a phase change of incident image light 1009 of zero. In a second accumulation period, modulation signal 1038 may cause display pixel driver 1080 to drive the liquid crystals of display pixel 1050 to a second orientation. The second orientation of the liquid crystal may cause a phase change of incident image light 1009 of $\pi/2$. In a third accumulation period, modulation signal 1038 may cause display pixel driver 1080 to drive the liquid crystals of display pixel 1050 to a third orientation. The third orientation of the liquid crystal may cause a phase change of incident image light 1009 of $\pi$. In a fourth accumulation period, modulation signal 1038 may cause display pixel driver 1080 to drive the liquid crystals of display pixel 1050 to a fourth orientation. The fourth orientation of the liquid crystal may cause a phase change of incident image light 1009 of $3\pi/2$. Thus, four measurements (e.g. V1, V2, V3, and Vn where n is the numeral 4) in memory 760 may corresponds to measurements of image light 1009 propagating through display pixel 1050.

Composite image engine 1299 is configured to receive the intensity value from intensity determination module 1073 and a phase value from phase determination module 1071 and generate a pixel value 1287 based at least in part on receiving the intensity value and the phase value. The pixel value 1287 is then populated into a pixel (for a 2D image) or a voxel (for a 3D image) of composite image 1289. Hence, the image charge values stored in memory 760 are used to generate a pixel value for composite image 1289. Composite image engine 1299 may also receive intensity values and phase values 1231 from other CIDPs in a panel that are configured similarly to the embodiment illustrated in FIG. 12. In one embodiment, pixel value 1287 is determined based at least in part on the intensity value, the phase value, and the phase and intensity values 1231 generated by other CIDPs in the panel.

Figure 13:
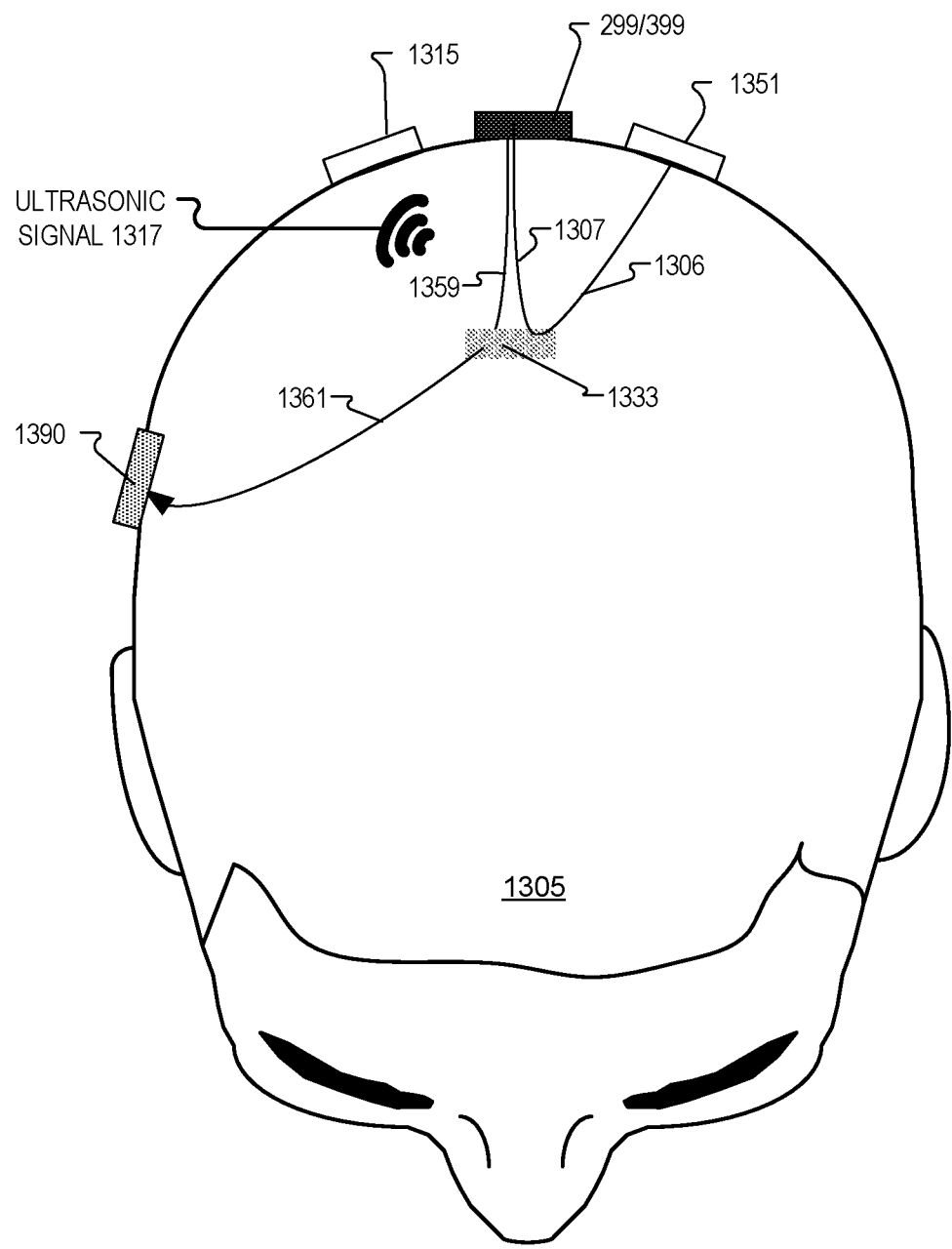
FIG. 13 illustrates example placements of a system and device including a co-located imaging and display pixel in relationship to a human head, in accordance with an embodiment of the disclosure.

FIG. 13 illustrates example placements of a system and device including a co-located imaging and display pixel in relationship to a human head, in accordance with an embodiment of the disclosure. FIG. 13 is a top-down view of a human head 1305. Embodiments of the disclosure may be implemented in the system and devices of example imaging system 1300 in FIG. 13. Imaging system 1300 includes a directional ultrasonic emitter 1315, an infrared illuminator 1351 (e.g. infrared LED), a light sensor 1390 (e.g. photodiode), and panels 299/399 that include CIDPs configured in accordance with embodiments of the disclosure.

FIG. 13 shows that infrared illuminator 1351 may illuminate tissue (e.g. the brain) of human head 1305 with infrared light 1306. Although infrared light is illustrated as a direct optical path, Infrared light 1306 will scatter to illuminate much of the tissue of human head 1305. Infrared light 1306 illuminates voxel 1333 of human head 1305. Directional ultrasonic emitter 1315 is activated to emit an ultrasonic signal 1317 that is focused on voxel 1333. The infrared light 1306 may become wavelength-shifted by the ultrasonic signal 1317 and that wavelength-shifted light 1307 propagates to panel 299/399 along a scattered optical path. Panel 299/399 may illuminate its image pixels of the CIDPs with a reference light that is the same wavelength as the wavelength-shifted light 1307 so that an interference between the reference light and the wavelength-shifted light 1307 may be measured by an array of image pixels in the array of CIDPs in panels 299/399. After an optical transformation is performed by panel 299/399 (e.g. using the optical transformation engines 620/720/1020), the display pixels in the array of CIDPS in panels 299/399 may emit display light 1359 that is a reconstruction (in reverse) of wavelength-shifted light 1307. The display light may have the same wavelength as wavelength-shifted light 1307. Thus, the display light reconstruction 1359 will be directed or focused back onto voxel 1333 and illuminate voxel 1333. Although wavelength-shifted light 1307 is illustrated as a relatively direct optical path, it is understood that the wavelength-shifted light 1307 takes a scattered optical path back to panel 299/399 and display light reconstruction 1359 takes that same scattered optical bath back to voxel 1333.

Since panel 299/399 is able to illuminate voxel 1333 with reconstruction 1359, an exit signal 1361 can be measured by a light sensor 1390. The amplitude of exit signal 1361 may give valuable information as to the density of voxel 1333 or the amount of blood in voxel 1333, for example. Although not illustrated, multiple sensors 1390, multiple panels 299/ 399, multiple directional ultrasonic emitters 1315, and multiple infrared illuminators 1351 may be placed around a diffuse medium such as human head 1305. A wearable hat may include system 1300 so that system 1300 can be worn as a wearable, in some embodiments. Other wearables may also include all or part of system 1300.

The term "logic" or "engine" in this disclosure may include one or more processors, microprocessors, multi-core processors, and/or Field Programmable Gate Arrays (FPGAs) to execute operations disclosed herein. In some embodiments, memories (not illustrated) are integrated into the logic or engine to store instructions to execute operations and/or store data. Processing logic may include analog or digital circuitry to perform the operations disclosed herein.

A "memory" or "memories" (e.g. 760) described in this disclosure may include volatile or non-volatile memory architectures.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A pixel comprising:
   an image pixel having a photosensitive element;
   a display pixel, wherein the image pixel is disposed under the display pixel and configured to receive infrared image light through the display pixel; and
   an optical transformation engine coupled between the image pixel and the display pixel, wherein the optical transformation engine is configured to modulate an amplitude of infrared display light emitted from the display pixel in response to receiving an infrared imaging signal generated by the photosensitive element of the image pixel.

2. The pixel of claim 1, wherein the image pixel receives light in a reception plane that is substantially parallel to an emission plane from which the display pixel emits display light.

3. The pixel of claim 1, wherein the display pixel includes a liquid crystal cell for modulating the infrared display light emitted by the display pixel, and wherein the image pixel is configured to receive the infrared image light through the liquid crystal cell.

4. The pixel of claim 1, wherein the optical transformation engine is configured to cause the display pixel to emit the infrared display light along a path in reverse of infrared image light incident on—the photosensitive element and having propagated through the display pixel.

5. The pixel of claim 1, wherein the optical transformation engine includes readout circuitry coupled to the photosensitive element to transfer an image charge generated by infrared image light incident on the photosensitive element, and wherein the readout circuitry includes in-pixel memory to store the infrared imaging signal and a second infrared imaging signal representative of a second image charge captured by the photosensitive element prior to the image charge.

6. A device comprising:
image pixels having photosensitive elements;
display pixels, the image pixels disposed under the display pixels;
at least one optical transformation engine coupled between the image pixels and the display pixels, wherein the optical transformation engine is configured to:
receive an illumination signal;
modulate an optical medium of the display pixels to a first orientation in response to receiving the illumination signal;
initiate a first image capture with the photosensitive elements disposed behind the display pixels, wherein the first image capture measures a first imaging signal of a first incident infrared imaging light propagating through the optical medium to the photosensitive elements;
modulate the optical medium of the display pixels to a second orientation different from the first orientation to illuminate a particular voxel with reconstructed infrared light; and
initiate a second image capture with the photosensitive elements, wherein the second image capture measures a second imaging signal of a second incident infrared imaging light propagating through the optical medium to the photosensitive elements subsequent to the reconstructed infrared light being scattered by the particular voxel.

7. The device of claim 6, wherein the optical transformation engine is further configured to:
determine pixel intensity values and pixel phase values based at least in part on the first image capture, the second image capture, the first orientation, and the second orientation;
generate a hologram based on the pixel intensity values and the pixel phase values; and
drive the hologram onto the display pixels, wherein an illumination of the hologram generates a reconstruction of the incident infrared imaging light that is focused or directed back into the particular voxel along a path in reverse of the incident infrared imaging light.

8. The device of claim 6, wherein the display pixel includes a liquid crystal cell for modulating infrared display light emitted by the display pixel, and wherein the image pixel is configured to receive the infrared image light through the liquid crystal cell.

9. The device of claim 6 further comprising:
an infrared emitter configured to emit infrared light, wherein the incident infrared imaging light includes at least a portion of the infrared light emitted by the infrared emitter remaining subsequent to the infrared light being scattered by the particular voxel, and wherein the illumination signal indicates that the infrared emitter is activated to emit the infrared light.

10. A method comprising:
modulating an optical medium of a display pixel to a first orientation;
initiating a first image capture with a photosensitive element disposed under the display pixel and configured to receive infrared imaging light through the display pixel, wherein the first image capture measures a first imaging signal of incident infrared imaging light propagating through the optical medium to the photosensitive element while the optical medium is in the first orientation;
modulating the optical medium of the display pixel to a second orientation different from the first orientation; and
initiating a second image capture with the photosensitive element, wherein the second image capture measures a second imaging signal of the incident infrared imaging light propagating through the optical medium to the photosensitive element while the optical medium is in the second orientation.

11. The method of claim 10 further comprising:
modulating the optical medium to a driving orientation based at least in part on the first imaging signal and the second imaging signal.

12. The method of claim 11 further comprising:
determining an intensity value of the incident infrared imaging light, wherein determining the intensity value includes averaging the first imaging signal and the second imaging signal;
determining a phase value of the incident infrared imaging light; and
determining a hologram pixel value based at least in part on the intensity value and the phase value, wherein the driving orientation is representative of the hologram pixel value.

13. The method of claim 11 further comprising:
determining an intensity value of the incident infrared imaging light, wherein determining the intensity value includes averaging the first imaging signal and the second imaging signal;
determining a phase value of the incident infrared imaging light;
providing the phase value and the intensity value to an aggregate hologram engine, wherein the aggregate hologram engine is coupled to receive a plurality of phase and intensity values from a plurality of imaging and display pixels; and
receiving an aggregate value from the aggregate hologram engine, wherein the aggregate value is determined based at least in part on the intensity value, the phase value, and the plurality of phase and intensity values from the plurality of imaging and display pixels,
wherein modulating the optical medium to the driving orientation includes driving the display pixel to the aggregate value received from the aggregate hologram engine.

14. The method of claim 10 further comprising:
generating a pixel value, wherein the pixel value is based at least in part on the first imaging signal and the second imaging signal; and
populating the pixel value into a composite image.

15. The method of claim 14, wherein generating the pixel value includes determining a phase of the incident infrared imaging light based at least in part on the first imaging signal, the second imaging signal, the first orientation, and the second orientation.

16. The method of claim 10, wherein the optical medium includes liquid crystal, and wherein modulating the optical medium to the first orientation includes driving a first voltage across the optical medium, and further wherein modulating the optical medium to the second orientation includes driving a second voltage across the optical medium, the first voltage different than the second voltage.

17. A method comprising:
receiving an illumination signal, the illumination signal indicative of activation of an illumination light source;
directing, in response to the receiving the illumination signal, sampling of at least two image charges, including at least:
receiving a first image signal generated by a photosensitive element, the first image signal indicative of a first amount of the illumination light reflected by a diffuse medium; and
receiving a second image signal generated by the photosensitive element, the second image signal indicative of a second amount of the illumination light reflected by the diffuse medium;
generating an optical transformation signal based at least in part on the first image signal and the second image signal; and
modulating an amplitude of light emitted from a display pixel response to receiving the optical transformation signal, wherein the photosensitive element is disposed under the display pixel and configured to receive the illumination light through the display pixel.

18. The method of claim 17, wherein generating the optical transformation signal comprises:
generating a difference signal representative of a difference between the first image signal and the second image signal; and
generating an inverted signal by inverting the difference signal, wherein the optical transformation signal is representative of the inverted signal.

19. The method of claim 17, wherein generating the optical transformation signal includes:
converting the first image signal to a first digital value;
storing the first digital value in a memory;
converting the second image signal to a second digital value; and
storing the second digital value in the memory.

20. The device of claim 9 further comprising:
an ultrasonic emitter configured to focus an ultrasonic signal on the particular voxel, wherein the infrared light emitted by the infrared emitter is wavelength-shifted by the ultrasonic signal, the wavelength-shifted infrared light being the first incident infrared imaging light propagating through the optical medium.

* * * * *